US011223108B2

(12) United States Patent
Choi et al.

(10) Patent No.: US 11,223,108 B2
(45) Date of Patent: Jan. 11, 2022

(54) MOBILE TERMINAL

(71) Applicant: LG ELECTRONICS INC., Seoul (KR)

(72) Inventors: Hakho Choi, Seoul (KR); Ahrah Koh, Seoul (KR); Seongcheol Lee, Seoul (KR); Sungdo Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/827,643

(22) Filed: Mar. 23, 2020

(65) Prior Publication Data

US 2021/0159585 A1 May 27, 2021

Related U.S. Application Data

(63) Continuation of application No. PCT/KR2019/016140, filed on Nov. 22, 2019.

(51) Int. Cl.
*H01Q 1/24* (2006.01)
*H04W 4/80* (2018.01)
(Continued)

(52) U.S. Cl.
CPC ........... *H01Q 1/243* (2013.01); *G06F 1/1652* (2013.01); *G06F 3/0412* (2013.01); *G06Q 20/3278* (2013.01); *H04W 4/80* (2018.02)

(58) Field of Classification Search
CPC . G06F 1/1652; G06F 3/0412; G06Q 20/3278; H01Q 1/243; H04B 5/0031;
(Continued)

(56) References Cited

U.S. PATENT DOCUMENTS

2015/0207913 A1 7/2015 Nakano et al.
2015/0326057 A1* 11/2015 Koyanagi ............. H01F 27/245
320/108

(Continued)

FOREIGN PATENT DOCUMENTS

EP 2869596 5/2015
EP 3089430 2/2016
(Continued)

OTHER PUBLICATIONS

European Patent Office Application Serial No. 20167878.6, Search Report dated Jul. 31, 2020, 10 pages.
(Continued)

*Primary Examiner* — Thien M Le
(74) *Attorney, Agent, or Firm* — Lee, Hong, Degerman, Kang & Waimey PC

(57) ABSTRACT

Disclosed herein is a mobile terminal including a body, a display panel coupled to the body with one surface thereof facing outward, the one surface allowing an image to be output therethrough, a fingerprint sensor positioned on an opposite surface of the display panel, a first coil antenna disposed around the fingerprint sensor, a support frame including an opening and configured to support the opposite surface of the display panel, the fingerprint sensor and the first coil antenna being positioned in the opening, and a controller configured to apply electric current to the first coil antenna. The mobile terminal may increase utilization of the rear surface thereof by arranging coil antennas on the front surface thereof.

16 Claims, 14 Drawing Sheets

(51) Int. Cl.
*G06F 1/16* (2006.01)
*G06F 3/041* (2006.01)
*G06Q 20/32* (2012.01)

(58) Field of Classification Search
CPC . H04B 5/0037; H04B 5/0081; H04M 1/0235; H04M 1/026; H04M 1/0266; H04M 1/0268; H04W 4/80
See application file for complete search history.

(56) References Cited

U.S. PATENT DOCUMENTS

| | | | |
|---|---|---|---|
| 2016/0261026 A1* | 9/2016 | Han | H04B 5/0031 |
| 2017/0033435 A1 | 2/2017 | Nakano | |
| 2018/0365466 A1* | 12/2018 | Shim | G06K 9/0004 |
| 2019/0006756 A1 | 1/2019 | Lee et al. | |
| 2019/0027808 A1 | 1/2019 | Mow et al. | |
| 2019/0097447 A1* | 3/2019 | Partovi | H01F 38/14 |
| 2019/0305824 A1* | 10/2019 | Antonetti | H01Q 7/00 |
| 2019/0372196 A1* | 12/2019 | Aso | H04B 5/0081 |
| 2019/0388028 A1* | 12/2019 | Kim | H01Q 1/24 |

FOREIGN PATENT DOCUMENTS

| | | |
|---|---|---|
| EP | 3258675 | 12/2017 |
| EP | 3270520 | 1/2018 |
| KR | 1020170124815 | 11/2017 |
| KR | 1020190115888 | 10/2019 |

OTHER PUBLICATIONS

PCT International Application No. PCT/KR2019/016140, Notification of Transmittal of the International Search Report and the Written Opinion of the International Searching Authority, or Declaration dated Aug. 21, 2020, 11 pages.

* cited by examiner (a)

(b)

(a)

(b)

(a)

(b)

(a)

(b)

(a)

(b)

(c)

(a)

(b)

(a)

(b)

(a)

(b)

(a)

(b)

MOBILE TERMINAL

CROSS REFERENCE TO RELATED APPLICATIONS

This application is a continuation of International Application No. PCT/KR2019/016140, filed on Nov. 22, 2019, the contents of which are hereby incorporated by reference herein in its entirety.

BACKGROUND

Field

The present disclosure relates to a mobile terminal having an antenna that radiates a signal forward.

Discussion of the Related Art

Terminals may be generally classified as mobile/portable terminals or stationary terminals according to their mobility. Mobile terminals may also be classified as handheld terminals or vehicle mounted terminals according to whether or not a user can directly carry the terminal.

A display device is an apparatus having a function of receiving, processing, and displaying an image that a user can watch. For example, the display device receives a broadcast signal selected by a user among broadcast signals transmitted from broadcasting stations, separates an image signal from the received signal, and displays the separated image signal on the display.

Recently, with advancement in broadcasting technology and network technology, the functions of display devices have been considerably diversified, and the performance of the devices has been improved accordingly. That is, display devices have evolved to provide not only broadcast contents but also various other contents to users. For example, a display device may provide game play, music listening, online shopping, user-customized information, etc. using various applications as well as a program received from a broadcasting station. In order to perform such extended functions, the display device is basically connected to other devices or networks based on various communication protocols, and may provide a user with an ubiquitous computing environment. In other words, display devices have evolved into smart devices that enable connectivity to the network and ubiquitous computing.

As display devices evolve into smart devices, various types of wireless communication technologies are applied, and one mobile communication scheme, such as LTE, requires a plurality of antennas to secure performance and meet various carriers' standards. Thus, the number of antennas mounted in a mobile terminal is increasing.

Wireless communication technology of antennas is affected by a metal material or electronic components located in the vicinity, and thus there are restrictions on arrangement of the antennas. Accordingly, it is difficult to mount a variety of antennas.

SUMMARY OF THE DISCLOSURE

An object of the present disclosure is to provide a mobile terminal having an antenna capable of radiation in a front direction in which a display is located in a situation where a mounting space for the mobile terminal is insufficient.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

In one aspect of the present disclosure, a mobile terminal may include a body, a display panel coupled to the body with one surface thereof facing outward, the one surface allowing an image to be output therethrough, a fingerprint sensor positioned on an opposite surface of the display panel, a first coil antenna disposed around the fingerprint sensor, a support frame comprising an opening and configured to support the opposite surface of the display panel, the fingerprint sensor and the first coil antenna being positioned in the opening, and a controller configured to apply electric current to the first coil antenna.

The mobile terminal may further include an adhesive tape coupled to the opposite surface of the display panel to fix the fingerprint sensor, the first coil antenna, and the support frame to the opposite surface of the display panel.

The first coil antenna may be configured to perform short-range wireless communication using a frequency signal of 15 MHz or less.

The display panel and the support frame may each include a variable part and a fixed part, wherein the variable part is bendably deformable and the fixed part is not bendably deformed, wherein the fingerprint sensor and the first coil antenna are positioned in the fixed part.

The body may be varied in size in a first direction, wherein the variable part of the display panel and the support frame may be positioned on a front surface or a rear surface of the body according to change in size of the body.

The mobile terminal may further include a ferrite sheet positioned on an opposite surface of the first coil antenna.

In another aspect of the present disclosure, a mobile terminal may include a body, a display panel coupled to the body with one surface thereof facing outward, the one surface allowing an image to be output therethrough, a support frame configured to support an opposite surface of the display panel, a slit formed in one region of the support frame, a first coil antenna positioned on an opposite surface of the support frame and arranged across the slit, and an insulating sheet positioned between the first coil antenna and the support frame.

The mobile terminal may further include a reinforcement member of a non-conductive material attached to the support frame and formed in a first region containing the slit, the enforcement member protruding toward the opposite surface of the support frame, wherein the first coil antenna may include a first conductive pattern having an annular shape and disconnected in a region corresponding to the first region, and a second conductive pattern formed in a shape corresponding to a curve of the reinforcement member to connect disconnected portions of the first conductive pattern.

The first conductive pattern may be formed on a flexible substrate to be coupled to the opposite surface of the support frame, and wherein the second conductive pattern may be formed by injection molding and fixed to the first conductive pattern by surface mount technology (SMT).

A length of the first second conductive pattern may be greater than a distance between the disconnected portions of the first conductive pattern.

The reinforcement member may have an inclined surface configured to become thinner as the inclined surface extends away from the slit, the inclined surface forming a continuous surface with the opposite surface of the support frame at an end of the first region.

The slit may extend to an end of the support frame so as to be open on one side.

The mobile terminal may further include a second coil antenna positioned inside the first coil antenna on the opposite surface of the support frame, wherein the support frame may be provided with a plurality of openings formed in a region corresponding to the second coil antenna.

The second coil antenna may be configured to perform a payment function by magnetic secure transmission (MST) for generating a magnetic field.

The first coil antenna may be configured to perform short-range wireless communication using a frequency signal of 15 MHz or less.

The body may be expandable in a first direction, wherein the display panel may include a flexible display panel comprising a front portion positioned on a front surface of the body and a rear portion positioned on a rear surface of the body, wherein, when the body is expanded, an area of the front portion of the display panel may increase and an area of the rear portion may be reduced.

The mobile terminal may further include an adhesive tape coupled to the opposite surface of the display panel and configured to fix the first coil antenna and the support frame to the opposite surface of the display panel, and a ferrite sheet positioned on an opposite surface of the first coil antenna.

The display panel and the support frame may each include a variable part and a fixed part, wherein the variable part is bendably deformable and the fixed part is not bendably deformed, wherein the first coil antenna and the slit may be positioned on the fixed part.

The mobile terminal of the present disclosure may increase utilization of the rear surface thereof by arranging coil antennas on the front surface thereof.

In addition, even when it is difficult to arrange the coil antennas on the rear side of the mobile terminal as in the case where the display unit extends up to the rear surface of the mobile terminal, the coil antennas may be provided.

Optimum openings for each of the coil antennas may be formed in the support frame 1512. Thereby, antenna performance may be secured while maintaining the rigidity of the support frame.

Further scope of applicability of the present disclosure will become apparent from the detailed description below. Various changes and modifications within the spirit and scope of the present disclosure may be clearly understood by those skilled in the art, and therefore, the detailed description and specific embodiments, such as preferred embodiments of the present disclosure, should be understood as given by way of example only.

BRIEF DESCRIPTION OF THE DRAWINGS

The present disclosure will become more fully understood from the detailed description given herein below and the accompanying drawings, which are given by illustration only, and thus are not limitative of the present disclosure, and wherein.

DETAILED DESCRIPTION OF THE DISCLOSURE

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Figure 1:
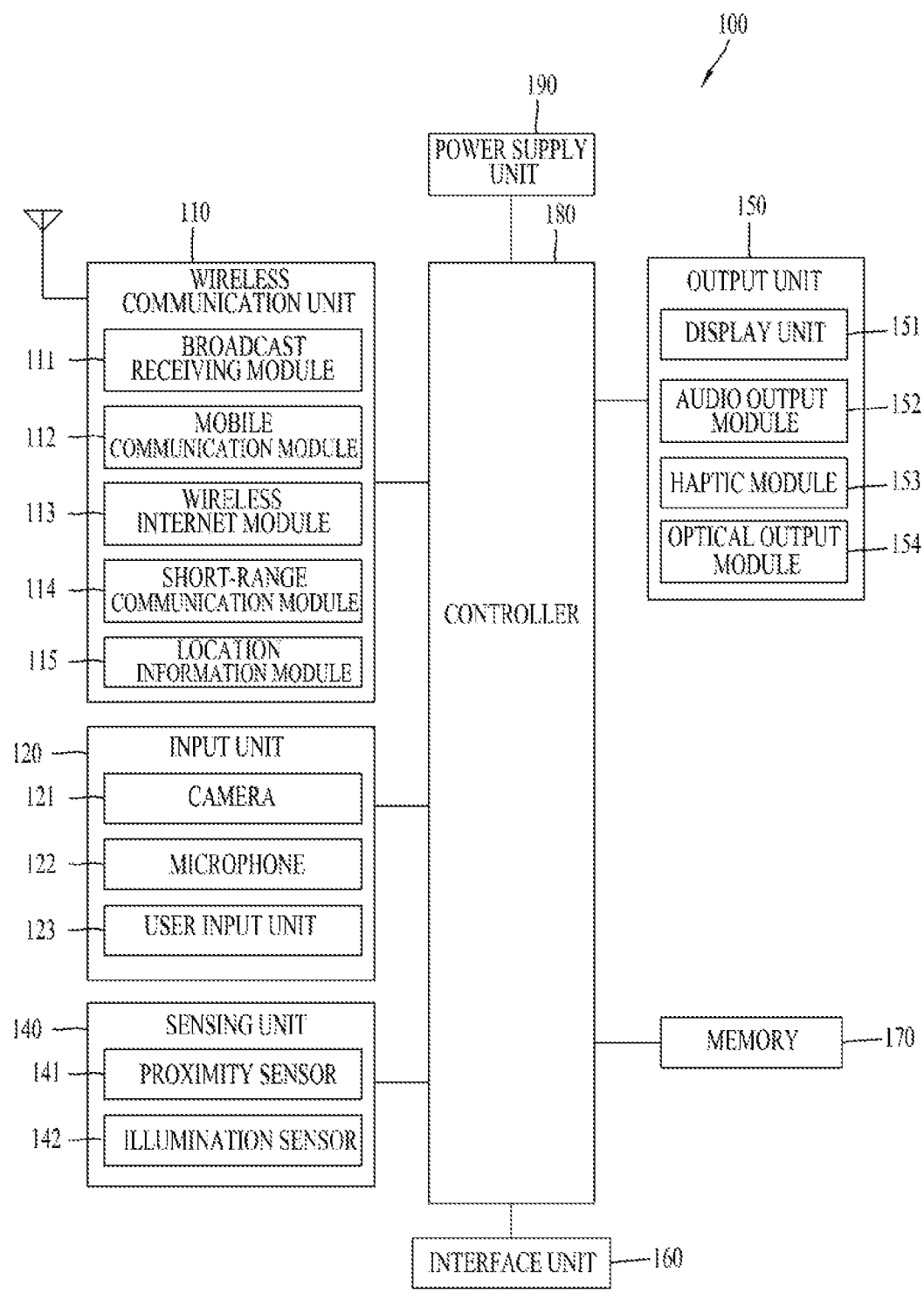
FIG. 1 is a block diagram of a mobile terminal in accordance with the present disclosure.

FIG. 1 is a block diagram of a mobile terminal in accordance with the present disclosure.

The mobile terminal 100 is shown having components such as a wireless communication unit 110, an input unit 120, a sensing unit 140, an output unit 150, an interface unit 160, a memory 170, a controller 180, and a power supply unit 190. Referring now to FIG. 1, the mobile terminal 100 is shown having wireless communication unit 110 configured with several commonly implemented components. It is understood that implementing all of the illustrated components is not a requirement, and that greater or fewer components may alternatively be implemented.

More specifically, the wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is typically implemented using one or more sensors configured to sense internal information of the mobile terminal, the surrounding environment of the mobile terminal, user information, and the like. For example, the sensing unit 140 may alternatively or additionally include other types of sensors or devices, such as a proximity sensor 141 and an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 may provide or process information or functions appropriate for a user by processing signals, data, information and the like, which are input or output, or activating application programs stored in the memory 170.

To drive the application programs stored in the memory 170, the controller 180 may be implemented to control a predetermined number of the components mentioned above in reference with FIG. 1. Moreover, the controller 180 may be implemented to combinedly operate two or more of the components provided in the mobile terminal 100 to drive the application programs.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

Some or more of the components may be operated cooperatively to embody an operation, control or a control method of the mobile terminal in accordance with embodiments of the present disclosure. Also, the operation, control or control method of the mobile terminal may be realized on the mobile terminal by driving of one or more application problems stored in the memory 170.

Hereinafter, referring to FIG. 1, the components mentioned above will be described in detail before describing the various embodiments which are realized by the mobile terminal 100 in accordance with the present disclosure.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sensing unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 may be provided with the power supplied by an external power source and the power supplied therein under the control of the controller 180 so as to supply the needed power to each of the components. The power supply unit 190 may include a battery. The battery may be a built-in type which is rechargeable and detachably loaded in the terminal to be charged.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Figure 2:
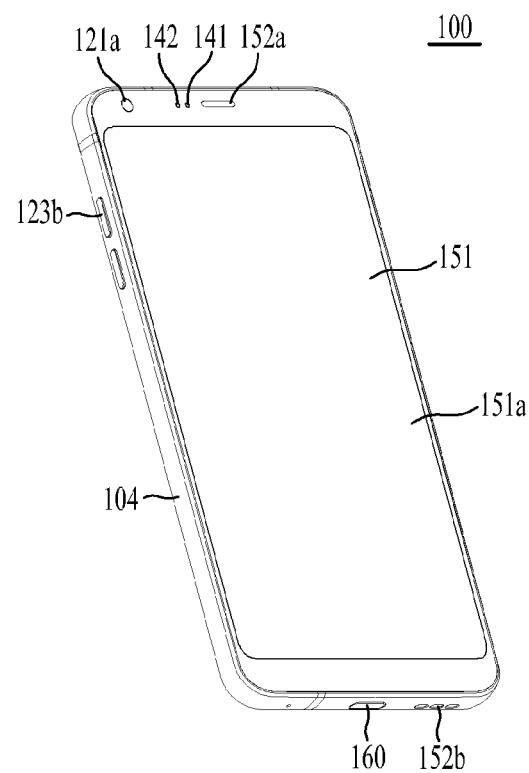
FIGS. 2 and 3 are perspective views seen from the front and rear of a mobile terminal according to an example.
Figure 3:
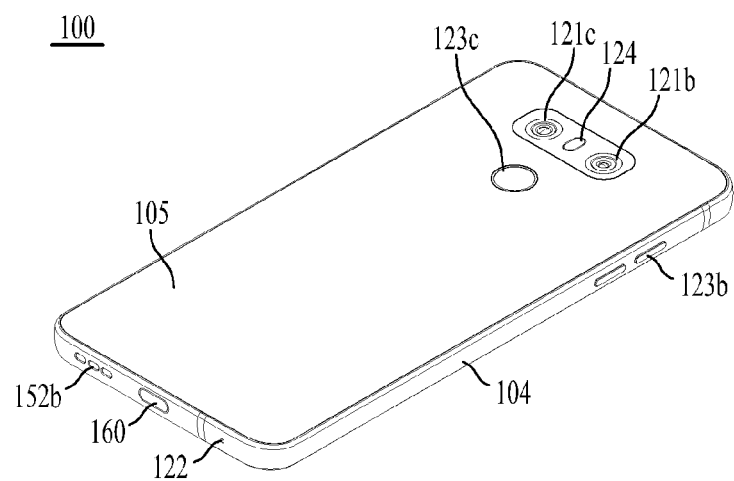

Referring now to FIGS. 2 and 3, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

Here, the terminal body may be understood to refer to the concept of this bore a mobile terminal (100) to at least one of the aggregate.

The mobile terminal 100 will generally include a case (for example, frame, housing, cover, and the like) forming the appearance of the terminal. In this embodiment, the case is formed using a front case and a rear case 105. Various electronic components are incorporated into a space formed between the front case and the rear case 105. At least one side case 104 may be additionally positioned between the front case and the rear case 105.

The display unit 151 is shown located on the front side of the terminal body to output information. As illustrated, a window 151a of the display unit 151 may be mounted to the front case 101 to form the front surface of the terminal body together with the front case.

In some embodiments, electronic components may also be mounted to the rear case 105. Examples of such electronic components include a detachable battery 191, an identification module, a memory card, and the like. Rear cover is shown covering the electronic components, and this cover may be detachably coupled to the rear case 105. Therefore, when the rear cover is detached from the rear case 105, the electronic components mounted to the rear case 105 are externally exposed.

As illustrated, when the rear cover is coupled to the rear case 105, a side surface of the rear case 105 is partially exposed. In some cases, upon the coupling, the rear case 105 may also be completely shielded by the rear cover. In some embodiments, the rear cover may include an opening for externally exposing a camera 121b or an audio output module 152b.

The cases may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the side case 104, between the front case and the rear case 105, or between the rear case 105 and the rear cover, to hermetically seal an inner space when those cases are coupled.

The mobile terminal 100 may include the display unit 151, the first and second audio output modules 152a and 152b, the proximity sensor 141, the illumination sensor 142, the optical output module 154, the first and second cameras 121a and 121b, the first and second manipulation units 123a and 123b, the microphone 122 and the interface unit 160.

It will be described for the mobile terminal as shown in FIGS. 2 and 3. The display unit 151, the first audio output module 152a, the proximity sensor 141, an illumination sensor 142, the optical output module 154, the first camera 121a and the first manipulation unit 123a are arranged in front surface of the terminal body, the second manipulation unit 123b, the microphone 122 and interface unit 160 are arranged in side surface of the terminal body, and the second audio output modules 152b and the second camera 121b are arranged in rear surface of the terminal body.

It is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 2 illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

A flash 124 is shown located adjacent to the second camera 121b. When an image of a subject is captured with the camera 121b, the flash 124 may illuminate the subject.

The second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 (see FIG. 1A). may be retractable into the terminal body. Alternatively, an antenna may be formed using a film attached to an inner surface of the rear cover, or a case that includes a conductive material.

A power supply unit 190 for supplying power to the mobile terminal 100 may include a battery 191, which is mounted in the terminal body or detachably coupled to an outside of the terminal body.

The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover is shown coupled to the rear case 105 for shielding the battery 191, to prevent separation of the battery 191, and to protect the battery 191 from an external impact or from foreign material. When the battery 191 is detachable from the terminal body, the rear case may be detachably coupled to the rear case 105.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

Figure 4:
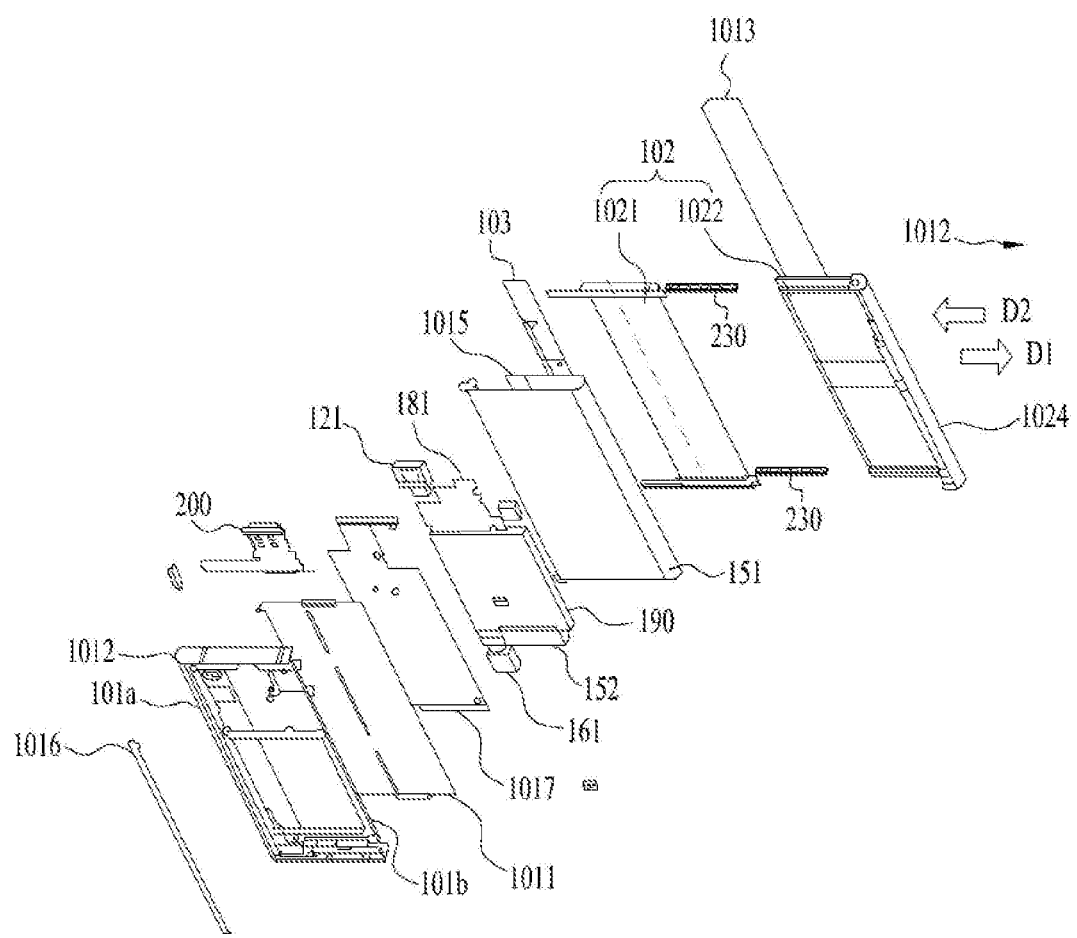
FIGS. 4 to 6 are views illustrating a first state and a second state of a mobile terminal according to another example.
Figure 5:
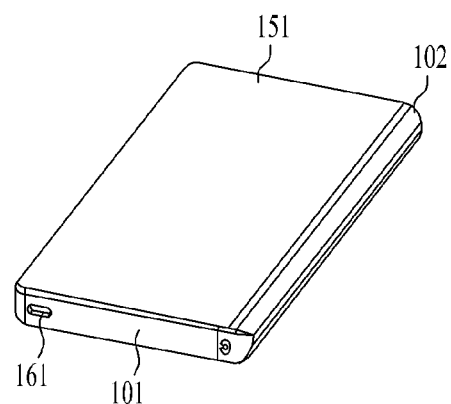
Figure 5:
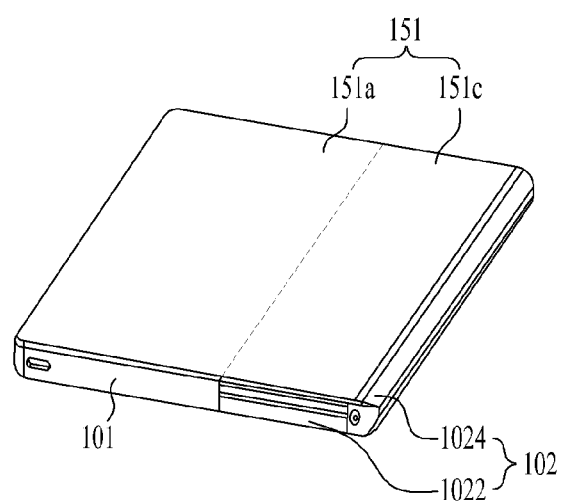
Figure 6:
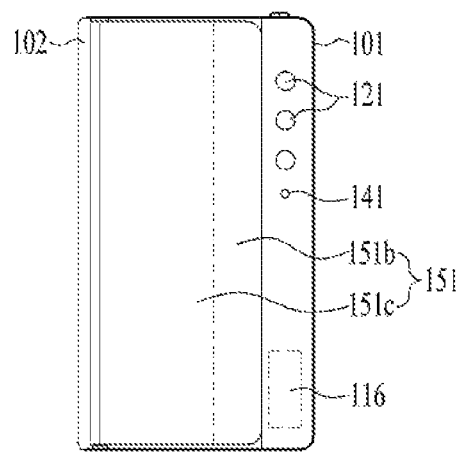
Figure 6:
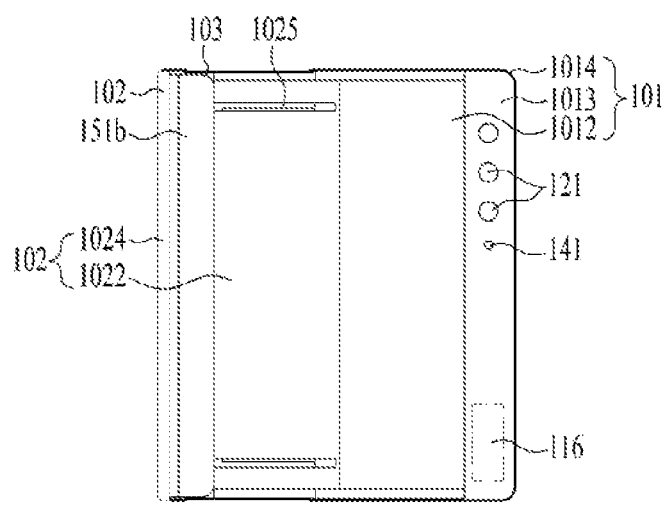

FIG. 4 is an exploded perspective view showing a mobile terminal according to the present disclosure. FIG. 5 is perspective views illustrating a first state and a second state of the mobile terminal viewed from one side. FIG. 6 is rear views illustrating the first state and the second state of the mobile terminal. Among the figures, FIGS. 5(*a*) and 6(*a*) show the first state of the mobile terminal, and FIGS. 5(*a*) and 6(*b*) show the second state of the mobile terminal.

As shown in the figures, the mobile terminal 100 in the first state is contracted and is smaller than the mobile terminal 100 in the second state. The display unit 151 positioned on the front surface of the mobile terminal 100 in in the first state is also smaller than in the second state. The mobile terminal 100 in the first state is expanded in a first direction D1, thereby switching to the second state. In the second state, the size of the mobile terminal 100 and the size of the front portion of the display unit 151 are larger than in the first state as shown in FIG. 5(*b*), and the size of the rear portion of the display unit 151 is reduced as shown in FIG. 6(*b*). That is, the display unit 151 positioned on the rear surface of the mobile terminal 151 in the first state moves to the front surface of the mobile terminal 100 in the second state.

In the following description, the direction in which the mobile terminal 100 and the display unit 151 thereof are extended or enlarged is referred to as a first direction D1, and the direction in which the mobile terminal 100 and the display unit 151 thereof is contracted, retracted or reduced is referred to as a second direction D2. A direction perpendicular to the first and second directions D1 and D2 is referred to as a third direction.

As such, to allow the position of the display unit to be changed, a flexible display that is bendable may be employed as the display unit 151. The flexible display is a lightweight and durable display that is built on a thin, flexible substrate that can be curved, bent, folded, twisted, or rolled like paper, while maintaining the characteristics of a conventional flat panel display.

In addition, electronic paper is a display technology applying the characteristics of the typical ink, may differ from the conventional flat panel display in that reflected light is used. Electronic paper may change information using twisting balls or electrophoresis employing capsules.

When the flexible display unit 151 is in an undeformed state (hereinafter referred to as a default state) (for example, the flexible display has an infinite radius of curvature), the display area of the flexible display unit 151 is flat. When the flexible display unit 151 in the default state is deformed by an external force (for example, the flexible display has a finite radius of curvature, hereinafter referred to as a deformed state), the display area may be a curved surface. As shown in the figure, the information displayed in the deformed state may be visual information output on the curved surface. The visual information is implemented by independently controlling light emission of unit pixels (sub-pixels) disposed in a matrix form. The unit pixel refers to a minimum unit for implementing one color.

In the default state, the flexible display unit 151 may be in a curved position (for example, a vertically or horizontally curved position) rather than a flat position. In this case, when external force is applied to the flexible display unit 151, the flexible display unit 151 may be deformed into a flat position (or less curved position) or a more curved position.

The flexible display unit 151 may be combined with a touch sensor to implement a flexible touch screen. When the flexible touch screen is touched, the controller 180 (see FIG. 1) may perform a control operation corresponding to the touch input. The flexible touch screen may be configured to sense a touch input not only in the default state but also in the deformed state.

The touch sensor senses a touch (or touch input) applied to the touch screen using at least one of various touch methods such as a resistive film method, a capacitive method, an infrared method, an ultrasonic method, and a magnetic field method.

As an example, the touch sensor may be configured to convert a change in pressure applied to a specific portion of the touch screen or a change in capacitance taking place at the specific portion into an electrical input signal. The touch sensor may be configured to detect a position, an area, a touch pressure, a capacitance of the touch, and the like of a touch object applying the touch on the touch screen.

The mobile terminal 100 may be provided with a deformation sensing means configured to detect deformation of the flexible display unit 151. The deformation detection means may be included in the sensing unit 140 (see FIG. 1).

The deformation sensing means may be provided in the flexible display unit 151 or the case (first frame and second frame 101 and 102, which will be described later) to sense information related to deformation of the flexible display unit 151 Can be. Here, the information related to the deformation may include a direction in which the flexible display unit 151 is deformed, a degree of the deformation, a position at which deformation occurs, a deformation time, and an acceleration at which the flexible display unit 151 is restored from the deformed position. In addition, the information may also include a variety of information that may be sensed according to bending of the flexible display unit 151.

In addition, based on the information related to deformation of the flexible display unit 151 sensed by the deformation sensing means, the controller 180 may change the information to be displayed on the flexible display unit 151 or generate a control signal for controlling the function of the mobile terminal 100.

State switching of the flexible display unit 151 (to the first or second state), that is, change in size of the display unit 151 on the front surface and rear surface of the mobile terminal 100 according to change in size of the mobile terminal 100, may be performed manually by the force exerted by the user, but is not limited thereto. For example, the mobile terminal 100 or the flexible display unit 151 staying in the first state may be deformed and changed to the second state by a command of a user or an application without external force applied by the user. As such, in order for the flexible display unit 151 to be automatically deformed without external force, the mobile terminal 100 may include a driving part 200, which will be described later.

The flexible display unit 151 of the present disclosure is bent by 180 degrees by being rolled around a side portion of the mobile terminal 100 facing in a first direction. Accordingly, a part of the display unit 151 is disposed on the front surface of the mobile terminal 100, and the other part of the display unit 151 is disposed on the rear surface of the mobile terminal 100 with respect to the side portion of the mobile terminal 100. A part of the display unit 151 positioned on the front surface of the mobile terminal 100 may be immovably fixed to the front surface of the mobile terminal 100, and the other part thereof positioned on the rear surface of the mobile terminal 100 may be movably arranged on the rear surface.

In addition, the display unit 151 may be rolled or unrolled around the side portion, thereby moving the portion thereof disposed on the rear surface e of the mobile terminal 100 such that the size of the region of the display unit 151 disposed on the front surface of the mobile terminal 100 may be adjusted. Since the flexible display unit 151 has a predetermined area and is configured as one continuous body, increasing the area of the front portion thereof decreases the area of the rear portion thereof. The display unit 151 may be rolled in a second frame 102 which is movable relative to a first frame 101, which will be described later, more specifically, around any side portion of the second frame 102. Depending on the direction in which the second frame 102 is moved to adjust the area of the display unit 151 on the front surface of the mobile terminal 100, the display unit 151 may be withdrawn from or pulled out of the second frame 102 or inserted or pushed into the second frame 102 while being rolled around the second frame 102. This operation will be described in more detail below along with other related components of the mobile terminal 100.

Typically, an antenna is provided in the case or the housing of the mobile terminal 100. However, the place where the antenna is installed in the case or housing may be limited by the flexible display unit 151, which covers the front and rear surfaces of the mobile terminal 100. For this reason, an antenna may be implemented on the flexible display unit 151. An antenna on display (AOD) is an antenna in which a transparent film is formed by laminating an electrode layer and a dielectric layer having a pattern engraved thereon. The AOD may be implemented to have a thickness less than that of the conventional antenna implemented through laser direct structuring (LDS) technology, which is implemented with copper-nickel plating. Accordingly, the AOD may not affect the overall thickness and may not be seen to the outside. In addition, the AOD may directly transmit and receive a signal through the display unit 151. Therefore, the mobile terminal 100 having the display units 151 arranged on both surfaces thereof as in the present disclosure may employ the AOD.

The mobile terminal 100 of the present disclosure includes frames 101 and 102 on which components are mounted. As shown in FIG. 4, the frames 101 and 102 of the present disclosure may vary in a first direction. As at least one of the frames 101 and 102 makes a relative movement, the size of the frames may vary in the first direction. The frames 101 and 102 have electronic components mounted therein and the flexible display unit 151 positioned outside thereof.

Since the mobile terminal 100 of the present disclosure includes the flexible display unit 151, the flexible display unit 151 may be coupled to the frames 101 and 102 in a manner of surrounding the front and rear surfaces of the frames 101 and 102. The frames may include a first frame 101 and a second frame 102, which moves in a first direction with respect to the first frame 101. The first frame 101 and the second frame 102 include a front portion, a rear portion and side portions, and are coupled to each other. Therefore, the first frame 101 and the second frame 102 coupled to each other may define a hexahedral appearance of the mobile terminal 100.

First, the first frame 101 corresponds to the main body of the mobile terminal 100 and may define a space for accommodating various components therein. In addition, the first frame 101 may accommodate, in the space, the second frame 102 movably coupled to the first frame 101. More specifically, the first frame 101 may include a first front portion 1011 disposed at the front of the mobile terminal 100 to support the front portion of the display unit 151, and a first rear portion 1012 disposed at the rear of the mobile terminal 100 to allow various components to be mounted thereon.

The first front portion 1011 and the first rear portion 1012 may be spaced apart from each other by a predetermined distance to define a predetermined space therebetween, and may be connected to each other by a side portion 1014. The side portion 1014 may be integrated with the first rear portion 1012 or the first front portion 1011. The camera 121, the audio output unit 152, an input/output terminal 161, the controller 180, and the power supply unit 190 may be accommodated in the space in the first frame 101 as components of the mobile terminal 100. For example, the controller 180 may include a circuit board 181 including a processor and an electronic circuit configured to control the operation of the mobile terminal, and the power supply unit 190 may include a battery 191 and related components. In addition, a driving unit 200 for controlling the slide movement of the second frame 102, which will be described later, may also be accommodated in the first frame 101.

As described above, the display unit 151 has a continuous body and may be disposed on both the front and rear surfaces of the mobile terminal 100 while being rolled in the mobile terminal 100. The display unit 151 may include a front portion positioned on the front surface of the mobile terminal 100, a rear portion positioned on the rear surface of the mobile terminal 100, and a side portion positioned between the front portion and the rear portion so as to surrounding the side of the mobile terminal. The front portion and the rear portion may be flat, and the side portion of the display unit 151 may have a curved surface. The flexible display unit 151 may be broken when bent. Therefore, the flexible display unit 151 may be configured to be bent with a predetermined curvature.

The display unit 151 may be divided into a fixed part and a variable part. The fixed part is a part fixed to the frame. Since the fixed part is fixed to the frame, it maintains a constant shape with the degree of bending thereof unchanged. On the other hand, the variable part is a part having a bent portion whose bending angle or position is changed. The variable part having a variable position or angle of bending requires a structure to support the rear surface of the variable part in response to the change.

The fixed part is coupled to the first frame of the display unit and thus is always positioned at the front to form a part of the front portion. The variable part includes a side portion positioned on a side of the mobile terminal. The position of the side portion varies according to the position of the second frame. The area of a region of the variable part positioned on the front surface and the area of a region of the variable part positioned on the rear surface vary with respect to the side portion. That is, a portion of the variable part may be a front portion and the other portion thereof may be a rear portion according to the first state and the second state. The variable part is positioned to face in the first direction of the mobile terminal with respect to the fixed part, and an end of the variable part is bent toward the rear surface of the mobile terminal and slides on the rear surface of the second frame.

The end of the variable portion of the display unit is coupled to a display frame configured to guide slide movement on the rear surface of the second frame. The display frame is moved in the first direction on the second frame when the second frame is moved in the first direction. As a result, the distance moved by the display frame is twice the distance of movement of the second frame relative to the first frame. In another example, as shown in FIG. 6, the first rear portion 1012 of the mobile terminal 100 may include an exposed rear portion 1013 that is exposed to the outside without being covered by the display unit 151 even in the first state. Various buttons and switches for operation of the mobile terminal 100, the camera 121, the physical input unit 120 such as flash, and the sensing unit 140 such as proximity sensor 141 or fingerprint sensor may be disposed on the exposed rear portion 1013. The first rear portion 1012 except the exposed rear portion 1013 may be covered by the display unit 151 in the first state as shown in FIG. 6(*a*), and may be exposed rearward in the second state as shown in FIG. 6(*b*).

A conventional bar-type terminal is provided with a display unit only at the front thereof. Thus, it has a main camera disposed on the back of the terminal in order for a user to photograph an object on the opposite side while viewing the display unit 151. An auxiliary camera is additionally required at the front of the terminal in order for the user to photograph himself while viewing the display unit.

On the other hand, the mobile terminal 100 of the present disclosure has the display unit 151 positioned on both the front and back thereof. Accordingly, when the user photographs himself, the display unit on the same side as the camera 121, i.e., a portion of the display unit 151 on the rear side of the mobile terminal 100 in the drawing may be used. When the user photographs an object on the opposite side of the user, the display unit on the opposite side of the camera 121, that is, a portion of the display unit 151 on the front surface of the mobile terminal 100 in the drawing may be used. Therefore, the mobile terminal 100 may photograph an object positioned on the opposite side of the user or the user using one camera 121. The camera may include a plurality of cameras having different angles of view, such as wide angle, ultra wide angle, and telephoto. In addition to the camera, a proximity sensor and an audio output unit may be positioned on the exposed rear portion 1013, and an antenna 116 may be installed on the exposed rear portion. An exposed decoration 1013 may be used in attaching the camera or the sensor of the exposed rear portion 1013 using in consideration of protection of the camera or the sensor and external design aspects.

The side portion 1014 may extend along the edges of the first front portion 1011 and the first rear portion 1012 to surround the circumference of the first frame 101, and may define the outer appearance of the mobile terminal 100. However, since the second frame 102 is accommodated in and movably coupled to the first frame 101 as mentioned above, a portion of the first frame 101 needs to be opened to allow a relative movement of this second frame 102 with respect to the first frame 101. As an example, as best seen in FIG. 4, the second frame 102 is movably coupled to either side of the first frame 101, and accordingly the side surface facing in the first direction may be left open by not forming the side portion 1014 on the side surface. Accordingly, the first frame 101 may include a first side portion 101*a* which is substantially closed and a second side portion 101*b* disposed on the opposite side to the first side portion 101*a* and left open. Since the side portion 1014 is exposed to the outside of the mobile terminal 100, the interface unit 160 for connection of a power port or an earphone jack or the user input unit 120 such as a volume button may be disposed on the side portion. When the side portion 1014 includes a metal material, the side portion 1014 may serve as an antenna.

The second frame 102 may include a second front portion 1021 disposed at the front of the mobile terminal 100 and a second rear portion 1022 disposed at the rear of the mobile terminal 100. Like the first front portion 1011 and the first rear portion 1012 of the first frame 101, the second front portion 1021 and the second rear portion 1023 may be formed of a generally flat plate member. In addition, the second frame 102 accommodates a variety of components and should not interfere with the components accommodated in the first frame 101 during movement. Accordingly, the second front portion 1021 and the second rear portion 1022 may be coupled so as to be spaced apart from each other to form a predetermined space, and may have a shape that does not interfere with the components in the first frame 101.

In addition, the display unit 151 may be bent 180 degrees while being rolled in the second frame 102 so as to be disposed on both the front and rear surfaces of the mobile terminal 100. To allow such an arrangement of the display unit 151, the second frame 102 may include a roller 1028 rotatably disposed therein. The roller 1028 may be disposed at any position inside the second frame 102. However, the display unit 151 should be spread flat on the front and rear surfaces of the mobile terminal 100 in order to provide a good quality screen to the user. To ensure this spreading, appropriate tension should be provided to the display unit 151. In order to provide appropriate tension, the roller 1028 may be disposed at an end of the second frame 102 facing in the first direction. The roller 1028 may extend in a second direction and may be rotatably coupled to the second frame 102.

The display unit 151 may be rolled around the roller 1028 while being gently curved with a predetermined curvature. The flexible display unit 151 may include a first surface on which an image is output and an inner surface facing the frame on the opposite side thereof, the first surface being exposed to the outside. The roller 1028 may be installed on the second frame 102 so as to freely rotate while contacting the inner surface of the display unit 151. Accordingly, the roller 1028 may move the display unit 151 substantially in a lateral direction of the mobile terminal 100, that is, in a direction perpendicular to the longitudinal direction of the mobile terminal 100. As will be described later, when the second frame 102 slides, the display unit 151 may be moved to the front or rear of the mobile terminal 100 relative to the second frame 102 in different directions (i.e., the first direction D1 or the second direction D2) by the tension applied by the second frame 102. This movement may be guided during rotation of the roller 1028.

In addition, the roller 1028 is disposed at a first side portion 102a of the second frame 102. The first side portion 102a substantially corresponds to the outermost side portion of the mobile terminal 100. In the case where the first side portion 102a of the second flame 102 is exposed, the display unit 151 rolled around the roller 1028 may be damaged. Accordingly, the second frame 102 may include a side frame 1024 disposed on the first side portion 102a.

The side frame 1024 may extend in the longitudinal direction of the second frame 102 to cover the first side portion 102a, thereby protecting the roller 1028 and the display unit 151 rolled therearound.

Since the side portion is rolled by a roller, the side portion is curved with a predetermined curvature, and the inner surface of the side frame may include a curved surface corresponding to the curvature of the side portion.

The second frame 102 has the first side portion 102a substantially closed by the side frame 1024. The side frame 1024 may substantially define the outer appearance of the mobile terminal 100 together with the side portion 1014 of the first frame 101. In addition, the second frame 102 may include a second side portion 102b disposed opposite to the first side portion 102a and open to minimize interference with the components in the first frame 101 during movement.

Such a second frame 102 may be movably coupled to the first frame 101 so as to slide in a predetermined first or second direction D1 or D2 with respect to the first frame 101. More specifically, as shown in the figure, the second frame 102 may be movably coupled to the first frame 101 via a side portion of the first frame 101, more specifically, the open second side 101b. More specifically, the second side portion 102b of the second frame may be disposed relatively adjacent to the first side portion 101a of the first frame 101 that is closed, and thus the first side portion 102a of the second frame may be disposed to face away from the first side portion 101a. Thus, the second side 102b is inserted into the first frame 101 through the side portion of the first frame, i.e., the second side portion 101b. The first side portion 102a is not inserted into the first frame 101 but is always positioned outside the first frame 101, thereby defining the outer appearance of the mobile terminal 100 as described above. However, when necessary, the first side portion 102a of the second frame 102 may also be inserted into the first frame 101.

Due to this positional relationship, the second frame 102 may extend or contract from the first frame 101 in a direction perpendicular to the longitudinal direction of the mobile terminal 100 or the first frame 101. That is, the first and second directions D1 and D2 may basically be directions perpendicular to the longitudinal direction of the mobile terminal 100 or the first frame 101. The first and second directions D1 and D2 may also be described as the lateral direction or the horizontal direction of the mobile terminal 100 or the first frame 101. In the movement of the first direction D1, the second frame 102 extends from the first frame 101. Accordingly, the first frame D1 may be a direction in which the second frame 102 moves away from the first frame 101, i.e., outwardly of the mobile terminal 100 or the first frame 101. On the other hand, in the movement of the second direction D2, the second frame 102 may contract into the first frame 101. Accordingly, the second direction D2 may be a direction opposite to the first direction D1. The second frame 102 may be moved close to the first frame 101, that is, inwardly of the mobile terminal 100 or the first frame 101 in the second direction D2. When the second frame 102 is moved in the first direction D1, the second frame 102 may be extended to apply force to a portion of the display unit 151 disposed on the rear surface of the mobile terminal 100, thereby additionally arranging the display unit on the front surface of the mobile terminal 100 and forming a region for such an additional arrangement. Accordingly, the second frame 102 may switch the mobile terminal 100 to the second state having the display unit 151 with the relatively extended front surface by moving in the first direction D1. On the other hand, when the second frame 102 is moved in the second direction D2, the second frame 102 may contract to the original state thereof and apply force to a portion of the display unit 151 disposed on the front surface of the mobile terminal 100 such that the display unit may return to the rear surface of the mobile terminal 100. Accordingly, the second frame 102 may switch the mobile terminal 100 to the first state having the display unit 151 with the relatively reduced front surface by moving in the second direction D2. Accordingly, the second frame 10 may selectively expose the display unit 151 on the front surface of the mobile terminal 100 according to the movement direction (that is, the first or second direction D1 or D2), thereby switching the mobile terminal 100 to the first or second state defined above.

During such extension and contraction in the first and second directions D1 and D2, the second frame 102 may overlap the first frame 101, more specifically, the first front portion 1011 and the first rear portion 1012 thereof, so as not to interfere with the first frame 101. More specifically, as described above, the display unit 151 may be coupled to and supported by the first front portion 1011 of the first frame 101, and accordingly does not need to be additionally supported by the second front portion 1021 of the second frame 102. Rather, when the second front portion 1021 is interposed between the first front portion 1011 and the display unit 151, the display portion 151 may be deformed or damaged due to friction against the second front portion 1021 that repeatedly moves. Accordingly, the second front portion 1021 may be disposed below the first front portion 1011 or may be inserted between the two layers of the first front portion 1011. The second rear portion 1022 of the second frame 102 may be disposed on the rear side of the first rear portion 1012 of the first frame 101. That is, the front surface of the second rear portion 1022 may face the rear surface of the first rear portion 1012. In addition, the rear surface of the first rear portion 1012 may contact the front surface of the second rear portion 1022 to stably support the movement of the second frame 102. By this arrangement, the second rear portion 1022 may be exposed to the outside of the first frame, more specifically, the first rear portion 1012, and may be coupled to the display unit 151.

In addition, the second frame 102 increase or decrease the size of the mobile terminal 100, in particular, expand or contract the front surface of the mobile terminal 100 by extending and contracting in the first and second directions D1 and D2. The display unit 151 needs to be moved as far as the expansion or contraction of the front surface to obtain the intended first and second states. However, when fixed to the second frame 102, the display unit 151 may not be smoothly moved to fit the front surface of the mobile terminal 100 that is extended or contracted. For this reason, the display unit 151 may be movably coupled to the second frame 102.

More specifically, the display unit 151 may include a first side edge or side end) 151d disposed on the front of the mobile terminal 100 and a second end 151e arranged opposite to the first end 151d and disposed on the rear surface of the mobile terminal 100. The first end 151 may be disposed on the front surface of the first frame 101, that is, the front surface of the first front portion 1011 thereof and arranged adjacent to a side portion of the mobile terminal 100, that is, the first side portion 101*a* of the first frame 101. On the other hand, since the second end 151*e* is adjacent to the rear surface of the mobile terminal 100, i.e., the second rear portion 1022 of the second frame 102, the second end portion 151*e* may be coupled to the second rear portion 1022 of the second frame 102 so as to move in the first and second directions D1 and D2. In addition, since the display unit 151 is not structurally strong, the display frame 103 may be coupled to the second end 151*e*. The display frame 103 may be formed of a plate member extending in the longitudinal direction of the mobile terminal 100.

Accordingly, the display frame 103 may be coupled to the second frame, i.e., the second rear portion 1022 thereof instead of the second end 151*e* so as to be movable in the first and second directions D1 and D2. The second frame 102 may include a slot 1025 extending in the lateral direction of the mobile terminal 100 or the second frame 102, that is, the direction perpendicular to the longitudinal direction thereof. The display frame 103 may be stably moved while being guided by the slot 1025. The display frame 103 may include, for example, a protrusion inserted into the slot 1025 to move along the slot 1025.

In relation to the configuration of the first to third frames 101, 102, and 103 as described above, the display unit 151 may include a first region 151*a* extending from one side thereof, that is, the first end 151*d* to the second end 151*d* opposite to the first end 151*d* by a predetermined distance, and a second region 151*b* disposed to face away from the first region 151*a* and extending from the second end 151*e* toward the first end 151*d* by a predetermined distance. The display unit 151 may further include a third region 151*c* disposed between the first and second regions 151*a* and 151*b*. The first to third regions 151*a*, 151*b*, and 151*c* may be connected to each other to form the continuous body of the display unit 151. In addition, as described above, the first region 151*a* may be immovably fixed to the front surface of the mobile terminal 100 and the second region 151*b* may be movably arranged on the rear surface of the mobile terminal, such that the third region 151*c* may move to the front surface or rear surface of the mobile terminal 100 according to the movement direction of the second frame 102. This configuration of the display unit 151 will be described in more detail below.

The first region 151*a* may be disposed on the front surface of the mobile terminal 100, more specifically, on the front surface of the first front portion 1011 of the first frame 101. The first region 151*a* may be fixed to the front surface of the first frame 101, that is, the first front portion 1011 so as not to be moved by movement of the second frame 102. Thus, the first region 151*a* may always be exposed on the front surface of the mobile terminal 100.

The third region 151*c* may be adjacent to the first region 151*a* toward the second end 151*e* and may extend into the second frame 102 and be rolled around the roller 1028. Then, the third region 151*c* may continuously extend out of the second frame 102 and partially cover the second frame 102, that is, the rear surface of the second rear portion 1022. In another example, the second frame 102, that is, the second rear portion 1022, may be arranged adjacent to the first frame 101, that is, the first rear portion 1012 to form the rear case of the mobile terminal 100 together with the first frame 101. Thus, the third region 151*c* may be described as being disposed on the rear surface of the first frame 101 as well.

The second region 151*b* may be adjacent to the third region 151*c* toward the second end 151*e*, and be disposed on the rear surface of the mobile terminal 100, more specifically, the rear surface of the second rear portion 1022 of the second frame. The second region 151*b* may be coupled to the display frame 103 rather than being directly coupled to the second frame 102. As shown in FIG. 6(*b*), a slot 1025 extending in the lateral direction (i.e., a direction perpendicular to the longitudinal direction of the mobile terminal 100) may be formed in the second frame 102, that is, the second rear portion 1022, and the display frame 103 may move along the slot 1025. While the slot 1025 is illustrated in FIG. 6(*b*) as being formed in the rear surface of the second frame 102, it may be formed on the side surface of the second frame 102.

The second region 151*b* may move together with the display frame 103 in the first or second direction D1 or D2 with respect to the second frame 102. However, the movement of the second region 151*b* may be limited to the rear surface of the mobile terminal 100 by the slot 1025. That is, the second region 151*b* may not move out of the second frame 102 even when the second frame 102 is extended or contracted, but may move along the slot 1025 within the second frame 102 by a distance of extension or contraction of the second frame 102. Therefore, the second region 151*b* may always be exposed on the rear surface of the mobile terminal 100.

As a result, the first region 151*a* may be disposed on the front surface of the mobile terminal 100 and always be exposed on the front surface regardless of the movement of the second frame 102, and the second region 151*b* may be disposed on the rear surface of the mobile terminal 100 and always be exposed on the rear surface regardless of the movement of the second frame 102. In addition, the third region 151*c* may be disposed between the first and second regions 151*a* and 151*b*, and may be selectively arranged on the front surface or rear surface of the mobile terminal 100 according to the movement direction D1, D2 of the second frame 102.

Due to such a selective arrangement of the third region 151*c*, the first rear portion 1012 of the first frame 101 may have a portion that is covered by the second and third regions 151*b* and 151*c* of the display unit 151 and the second rear portion 1022 in the first state and is exposed to the outside of the mobile terminal 100 in the second state according to movement of the third region 151*c* to the front surface of the mobile terminal 100 and movement of the second rear portion 1022 in the first direction D1, as shown in FIG. 6(*b*). In addition, the second front portion 1021 of the second frame 102 may be hidden by the first front portion 1011 of the first frame 101 in the first state. However, in the second state, the second front portion 1021 may move out of the first frame 101 to support the third region 151*c* of the display unit 151 disposed on the front surface of the mobile terminal 100.

A separation plate 1017 may be positioned on the rear side of the second front portion 1021 to prevent the second front portion 1021 from affecting the internal components during slide movement of the second front portion 1021, and may be fastened to the first front portion 1011. The second front portion 1021 may move between the first front portion 1011 and the separation plate 1017 according to the slide movement of the second frame.

However, the third region 151*c* may be bent by being rolled around the roller 1028 in the second frame 102. In switching from the first state to the second state, the third region 151*c* may expand from the second frame 102 to the front surface of the mobile terminal 100 while being rolled around the roller 102B in one direction. On the other hand, in switching from the second state to the first state, the third region 151c may be contracted from the front surface of the mobile terminal 100 into the second frame 102 while being rolled around the roller 102B in the opposite direction. At the same time, the third region 151c may return to the rear surface of the mobile terminal 100 from the second frame 102.

A foldable mobile terminal that is unfolded like a book is easy to be broken at a specific position because only portion thereof at the specific position is repeatedly folded. On the other hand, the deformed portion of the flexible display unit 151, that is, the portion rolled around the roller 102B, may vary according to the first and second states of the mobile terminal 100, that is, the movement of the second frame 102. Accordingly, the mobile terminal 100 of the present disclosure may significantly reduce deformation and fatigue repeatedly applied to a specific portion of the display unit 151, thereby preventing the display unit 151 from be damaged.

Based on the above-described configuration, the overall operation of the mobile terminal 100 will be described below. As an example, the state switching may be performed manually by the user, and the operation of the mobile terminal 100 during this manual state switching will be described. However, the operation of the first to third frames 101 to 103 and the display unit 151 described below may be performed in the same manner even when a power source other than the user's power is used, for example, when the driving unit 200, which will be described later, is applied.

Since the antenna is configured to transmit and receive a wireless signal, the antenna is affected by a conductive material located in the vicinity. In order to minimize the influence of other components, the antenna may be generally disposed at the outermost side of the mobile terminal 100. As the area of the screen of the mobile terminal 100 increases, the available space in the mobile terminal 100 is narrowed. A part of the case may be used to position the antenna at the outermost side, but may be affected by a design component of the mobile terminal 100. The display unit 151 includes a support frame made of a metal material to support the rear surface of the display panel 1511, and therefore it is common to arrange the antenna so as to overlap the display unit 151 as little as possible. The case on the side surface of the mobile terminal 100 may be used to implement the antenna.

As the functions of the mobile terminal 100 are extended, wireless communication schemes utilized in the mobile terminal 100 are diversified, and a plurality of antennas is required to perform these various wireless communication functions. In the mobile communication system, multiple antennas are required to increase the speed in LTE and to utilize signals of different frequency bands according to operators, and an antenna for functions such as Bluetooth, Wi-Fi, and GPS is additionally required. A near field communication (NFC) antenna for short-range wireless communication, a pay antenna for a payment function, a wireless charging antenna, and the like may be implemented in the form of a coil and disposed on the rear side of the mobile terminal 100 because they operate based on a low frequency signal.

For the mobile terminal 100 having the display unit 151 positioned on the rear surface of the mobile terminal 100 as shown in FIG. 6(a), it is difficult to utilize the rear surface of the mobile terminal 100. A terminal having a bar shape as shown in FIG. 3 may lack a space for mounting an antenna if the materials of the rear surface of the mobile terminal 100 are diversified or parts are arranged on the rear surface.

In order to address this issue, a configuration of the mobile terminal 100 that allows a coil-type antenna to be disposed to overlap the display unit 151 will be described. Antennas mounted in the mobile terminal 100 as coil-type antennas include an NFC antenna for short-range wireless communication, a pay antenna for a payment function, and a charging antenna for wireless charging. The NFC antenna is a contactless wireless communication technology that enables exchange of data at a short distance within about 10 cm using a frequency of a 13.56 MHz band. This antenna is mainly used for transportation cards, membership cards, coupons, and release of door locks. The NFC antenna has a short communication distance, which is a disadvantage, but is more secure than conventional RFID technology and enables reading and writing.

The pay antenna refers to a magnetic secure transmission (MST) scheme that generates and provides a wireless signal for the same information as magnetic information generated when the magnetic tape is swiped. When the card is registered, the card number may be encrypted and transmitted to the card company, and then a token, which is a virtual card number, may be assigned and payment may be performed. The frequency of the signal generated by the pay antenna is in a low frequency band of 100 kHz or less, and thus the pay antenna may employ a longer coil than the NFC antenna.

The wireless charging antenna creates an electromagnetic field by allowing current to flow through a charger coil and electric current flows through the charging antenna of a terminal positioned in the electromagnetic field to charge the battery. In order to place the charging antenna in the electromagnetic field and make the charging antenna operate in the continuous electromagnetic field, there must be no element that interferes with the electromagnetic field formed by the charger coil in the vicinity of the charging antenna. The frequency range used by the charging antenna is a band higher than the band of the pay antenna (more than 100 kHz) and lower than or equal to 300 kHz. Thus, the charging antenna uses signals of a frequency band lower than that of the NFC antenna.

Figure 7:
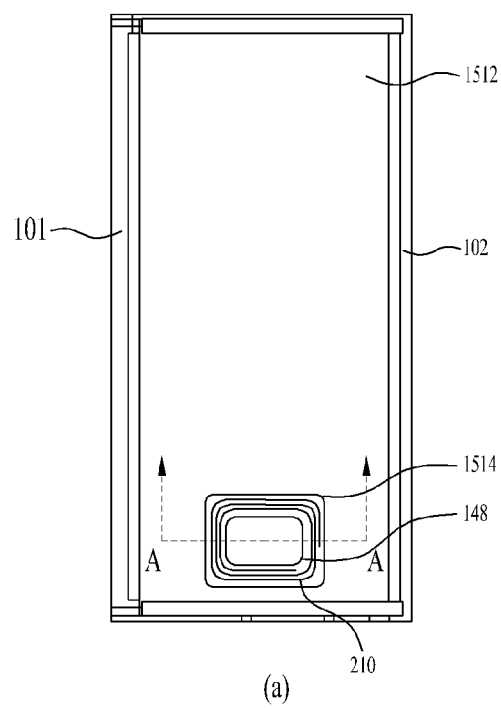
FIG. 7 is a view illustrating an example of coil antennas and a fingerprint sensor of a mobile terminal.
Figure 7:
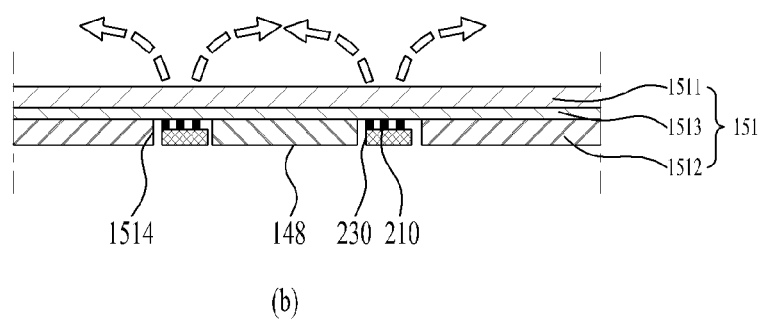
Figure 8:
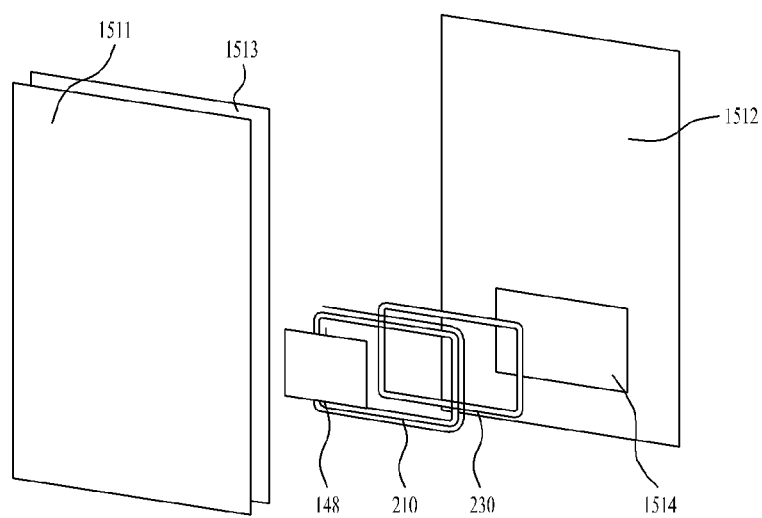
FIG. 8 is an exploded perspective view showing the display unit, coil antennas, and fingerprint sensor of the mobile terminal according to the embodiment of FIG. 7.

FIG. 7(a) is a view illustrating an example of coil antennas 210 and 220 and a fingerprint sensor 148 of the mobile terminal 100, omitting the display panel 1511. FIG. 7(b) is a cross-sectional view taken along line A-A of FIG. 7(a). FIG. 8 is an exploded perspective view showing the display unit 151, coil antennas 210 and 220, and fingerprint sensor 148 of the mobile terminal 100 according to the embodiment of FIG. 7. The display unit 151 may include a display panel 1511 configured to output an image and a support frame configured to support the rear surface thereof. The support frame 1512 may include a metal material for rigidity and for grounding of the display panel 1511. The flexible display unit 151 as shown in FIG. 5 also needs a support frame 1512 to support the rear surface to ensure accurate touch input and make the display unit 151 flat because the display panel 1511 is thin.

However, since the support frame 1512 includes a metal material, it is difficult to arrange the antenna to overlap the display unit 151. In order to address this issue, a part of the support frame 1512 of the display unit 151 may be omitted and the antenna may be arranged. Openings 1516 and 1517 for the antenna may be separately formed in the support frame 1512. Alternatively, the coil antennas 210 and 220 may be implemented using an opening 1514 formed for the fingerprint sensor 148 overlapping the display unit 151, as shown in FIGS. 7 and 8.

The fingerprint sensor 148 is an electronic device configured to detect the irregularities of the user's finger. In order to detect fine irregularities, light, ultrasonic waves, or a capacitive technique may be used. Since these techniques utilize electromagnetic waves or extract a distance between a finger and an electrode based on capacitance, the fingerprint sensor cannot be arranged overlapping the support frame 1512 including a conductive material. Accordingly, as shown in FIG. 7(*a*), the opening 1514 may be formed by omitting a portion corresponding to the fingerprint sensor 148 from the support frame 1512.

In this embodiment, a first coil antenna 210 may be disposed to surround the fingerprint sensor 148 using the opening 1514. The first coil antenna 210 may be implemented by directly forming a coil-shaped conductive material on the back of the display panel 1511. And the first coil antenna 210 may be implemented by forming a substrate including an insulating sheet and coil-shaped conductive material placed on the insulating sheet, and the substrate is attached on the back of the display panel 1511. Since the opening 1514 of the support frame 1512 for the fingerprint sensor 148 is small, the first coil antenna 210 may be an NFC antenna operating based on a relatively high frequency. Since the pay antenna performing the payment function operates in a signal band of 15 kHz, a relatively large antenna is needed compared to the NFC antenna. The NFC antenna is more suitable to use the opening 1514 of the fingerprint sensor 148.

As shown in FIG. 8, the display unit 151 may include a display panel 1511 configured to output an image is output and a support frame 1512 configured to support a rear surface thereof. A adhesive tape 1513 may be disposed between the support frame 1512 and the display panel 1511. The support frame 1512 may have an opening 1514 formed at a position corresponding to the fingerprint sensor 148 and the first coil antenna 210. The fingerprint sensor 148 and the first coil antenna 210 may be attached to the rear surface of the display panel 1511. A magnetic sheet 330, such as a ferrite sheet 230, may be attached to the rear surface of the first coil antenna 210 such that the signal of the first coil antenna 210 is not affected by the components inside the mobile terminal 100. FIG. 7(*b*) is a cross-sectional view taken along line A-A of FIG. 7(*a*). Referring to the figure, there is no conductive material that interferes with radiation of the signal in the forward direction of the first coil antenna 210, and thus an antenna to radiate the signal in the forward direction of the display unit 151 may be configured.

Figure 9:
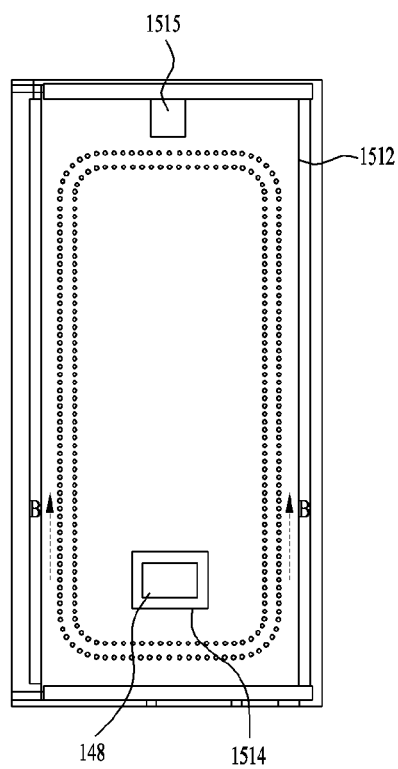
FIG. 9 is a view illustrating another example of a coil antenna and a fingerprint sensor of a mobile terminal.
Figure 9:
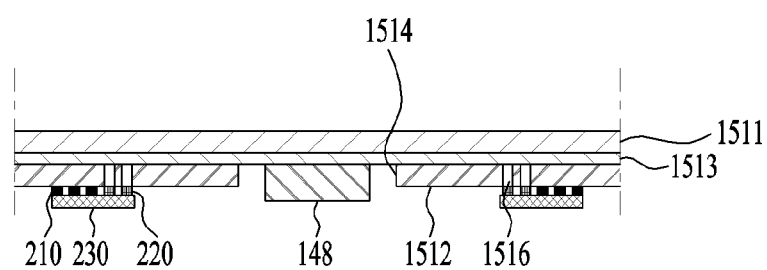
Figure 10:
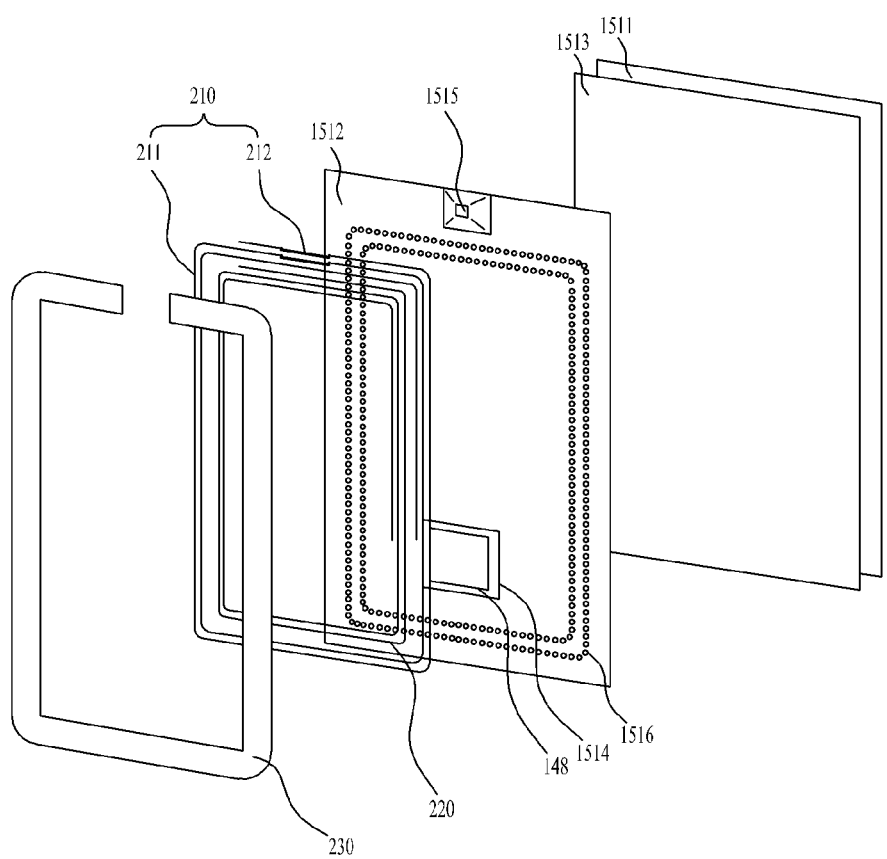
FIG. 10 is an exploded perspective view illustrating a display unit, a coil antenna, and a fingerprint sensor of the mobile terminal according to the embodiment of FIG. 9.

FIG. 9(*a*) is a view illustrating an example of the coil antennas 210 and 220 and the fingerprint sensor 148 of the mobile terminal 100, omitting the display panel 1511. FIG. 9(*b*) is a cross-sectional view taken along line B-B of FIG. 9(*a*). FIG. 10 is an exploded perspective view showing the display unit 151, coil antennas 210 and 220, and fingerprint sensor 148 of the mobile terminal 100 according to the embodiment of FIG. 9. Unlike the above-described embodiment, the coil antennas 210 and 220 are implemented separately from the fingerprint sensor 148. Although FIGS. 9 and 10 show the fingerprint sensor, the coil antennas 210 and 220 may be independently implemented regardless of presence or absence of the fingerprint sensor 148.

As shown in FIG. 10, the coil antennas 210 and 220 of the present disclosure may be arranged at the outer edge of the front display unit 151 to take full advantage of the front size of the mobile terminal 100. However, unlike the above-described embodiment, forming an opening in a whole range corresponding to the coil antennas 210 and 220 of the present embodiment may lower the rigidity of the support frame 1512 because the range occupied by the coil antennas 210 and 220 is wide. Accordingly, an opening may not be formed in the support frame 1512 such that the entire coil antennas 210 and 220 are exposed in the forward direction. The coil antennas 210 and 220 may be overlapped with the support frame 1512. Instead, the coil antenna 210 and 220 may be implemented by forming a substrate including an insulating sheet and coil-shaped conductive material placed on the insulating sheet. And the substrate is attached to the rear surface of the support frame 1512 such that the coil antennas 210 and 220 are not to directly contact the support frame 1512 including the conductive material.

In the present embodiment, the two coil antennas 210 and 220 may be formed simultaneously as shown in FIG. 10, or only one of the two coil antennas 210 and 220 may be selectively formed. While it is illustrated that the first coil antenna 210 is positioned outside and the second coil antenna 220 is positioned inside, embodiments are not limited thereto. The second antenna may be positioned outside. The first coil antenna 210 may be used as an NFC antenna, and the second coil antenna 220 may be used as a pay antenna. Since the signal of the first coil antenna 210 is a high frequency signal, the signal cannot be transmitted through the support frame 1512 made of metal due to low transmittance thereof.

In order to address the aforementioned issue, openings 1516 and 1517 may be formed in at least a portion of the support frame 1512. When an opening 1517 having a slit shape that crosses at least a portion of the first coil is formed in the support frame 1512, a signal may be radiated through the opening 1517. The slit-shaped opening 1517 may extend to the end of the support frame 1512 and thus may be open on one side. The open end of the slit may be positioned on the left and right sides of the mobile terminal 100. However, since the left and right sides of the mobile terminal may be touched by the user when the user holds the mobile terminal. Accordingly, the open end may be positioned at the top or bottom of the mobile terminal. The slit-shaped opening 1517 extending from the end may have a narrow shape whose length is greater than the width thereof, and the first coil antenna 210 may extend in the width direction of the opening 1517.

Diffraction of the wavelength of the signal may enable a wireless signal to be transmitted even when the opening 1517 is thin as a slit. However, the slit-shaped opening 1517 formed in the support frame 1512 has an open end extending to the end of the support frame 1512. Accordingly the slit may be widened or the support frame 1512 may be torn apart in the process. In order to prevent this issue, a reinforcement member formed of a non-conductive material may be disposed in the opening 1517.

Figure 11:
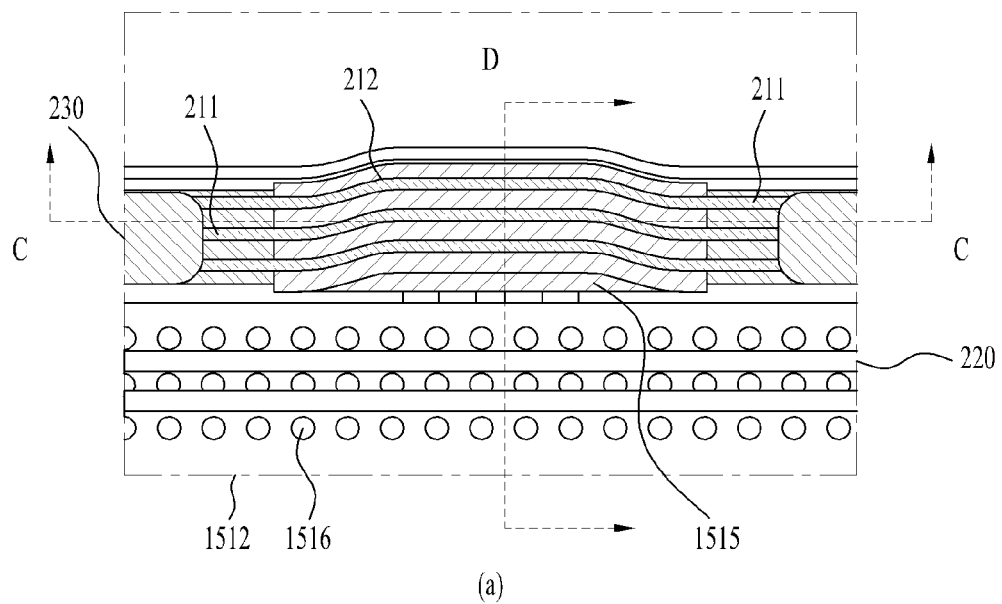
FIG. 11 is an enlarged view of the slit portion of FIG. 9.
Figure 11:
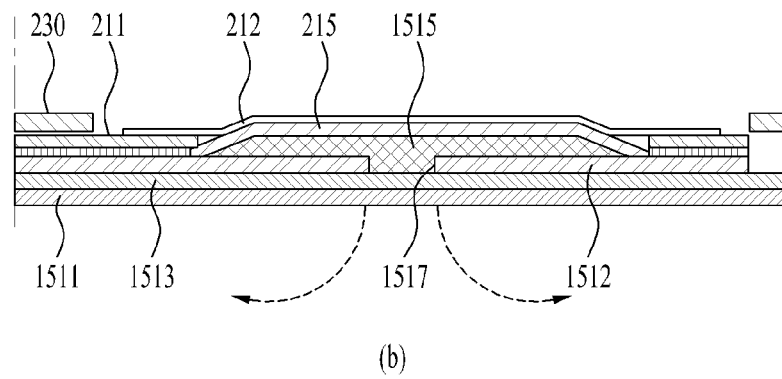
Figure 11:
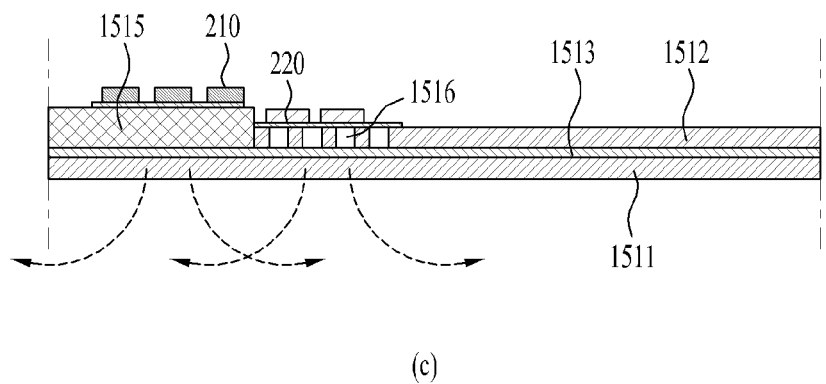

FIG. 11(*a*) is an enlarged view of the slit portion of FIG. 9(*a*), FIG. 11(*b*) is a cross-sectional view taken along line C-C of FIG. 11(*a*), and FIG. 11(*c*) is a cross-sectional view taken along line D-D of FIG. 11(*b*). In FIGS. 11(*b*) and 11(*c*), the bottom side is the front of the mobile terminal 100. The reinforcement member may be coupled to the support frame 1512 having the slit-shaped opening 1517 in a double-injection manner. In the case where only the slit-shaped opening 1517 is filled with the reinforcement member, the reinforcement member may be easily separated from the support frame 1512. The reinforcement member may the extended up to the lateral portions of the slit to enhance bonding between the support frame 1512 and the reinforcement member. Since the display panel 1511 is disposed on the front side, a flat surface should be provided on the front side. Accordingly, the reinforcement member is positioned only in the opening 1517 on the front surface of the support frame 1512 as shown in FIGS. 9(*a*) and 11(*b*). On the rear surface of the support frame 1512, the reinforcement member is positioned to reach even the left and right sides of the opening 1517 as shown in FIGS. 10 and 11(*b*). The reinforcement member may protrude from the rear surface of the support frame 1512 in order to cover even the left and right sides of the opening 1517. Since the support frame is a thin plate-shaped metal member, the reinforcement member may include a portion protruding from the support frame 1512 rearward.

The reinforcement member may have an inclined surface that becomes thinner as it extends away from the slit, and may form a continuous surface with the opposite surface of the support frame 1512 at the end of the first region. When the reinforcement member is stepped in the left and right direction, the first coil antenna 210 may be worn and damaged by the corner of the step. Therefore, the reinforcement member needs to form a continuous surface through the inclined surface.

The first coil antenna 210 may be configured integrally. Alternatively, in order to make the support frame 15 closely contact the first coil antenna 210, which may compensate for the step of the reinforcement member, the first coil antenna 210 may include a plurality of first overlapping annular conductive patterns 211 disconnected at a position corresponding to the reinforcement member, and a second conductive pattern 212 connecting the separated first conductive patterns and attached to the rear surface of the reinforcement members.

The first conductive patterns 211 may be implemented on a flexible substrate (insulating sheet), and the second conductive pattern 212 may be fixed to the flexible substrate using surface mount technology (SMT). The material of the second conductive pattern 212 may include phosphor bronze or stainless steel. In this case, the second conductive pattern may be formed to be very rigid and thin. The second conductive pattern 212 may be longer than of the disconnection region of the first conductive patterns 211 and may thus partially overlap the first conductive patterns. An adhesive tape 215 may be interposed between the second conductive pattern and the reinforcement member.

The second coil antenna 220 may be disposed inside the first coil antenna 210 as shown in FIG. 10 so as not to overlap the first coil antenna 210. Since the second coil antenna 220 transmits and receives signals of a low frequency band as a pay antenna, the signals may be transmitted through the support frame 1512 made of a conductive material. However, to further improve performance, an opening consisting of a plurality of holes 1516 may be formed in a portion of the support frame corresponding to the second coil antenna 220 as shown in FIGS. 9 and 10. The plurality of holes 1516 may be implemented as circular holes as shown in the figure, or may be formed in a mesh shape. The payment signal may be transmitted through the plurality of holes. A shielding film such as the ferrite sheet 230 may be attached to the rear side of the first coil and the second coil.

Figure 12:
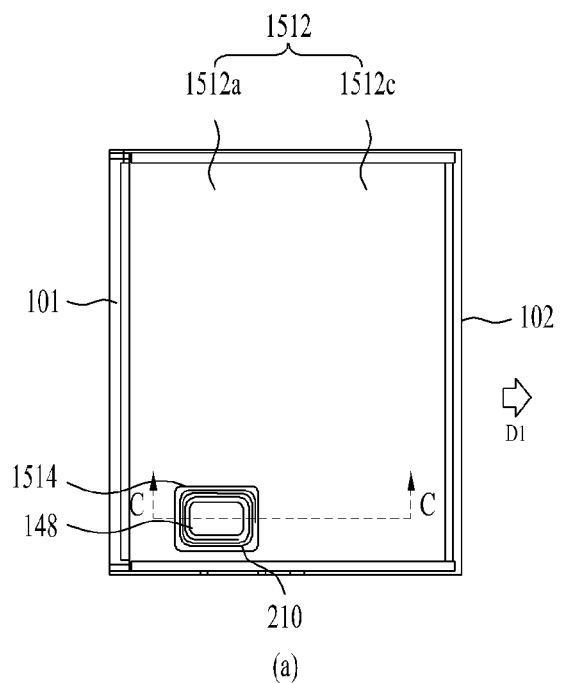
FIGS. 12 and 13 are views illustrating coil antennas and a fingerprint sensor applied to a mobile terminal according to another example.
Figure 12:
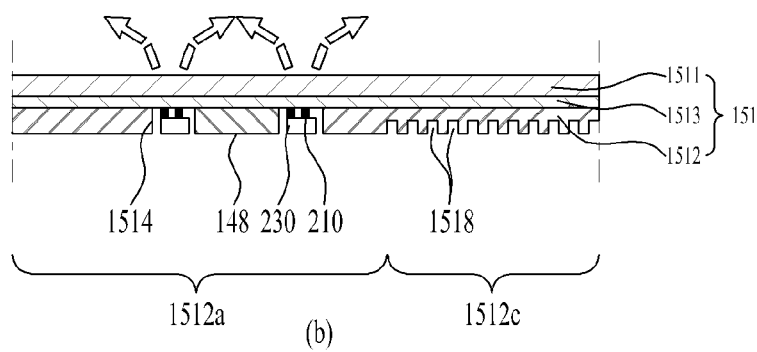
Figure 13:
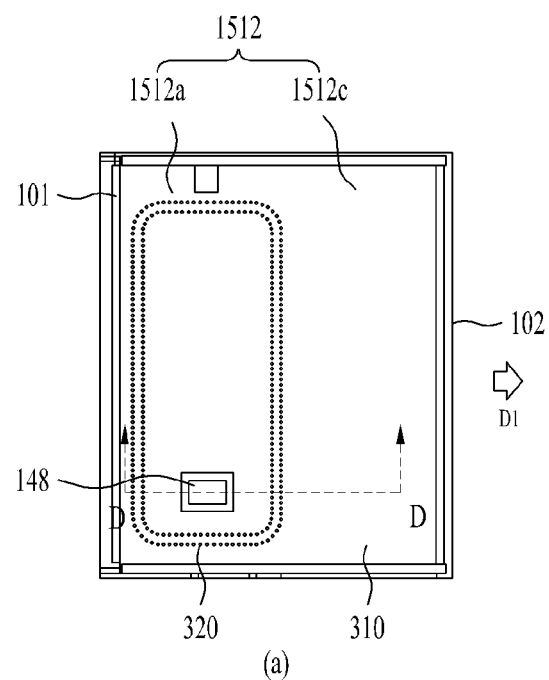
Figure 13:
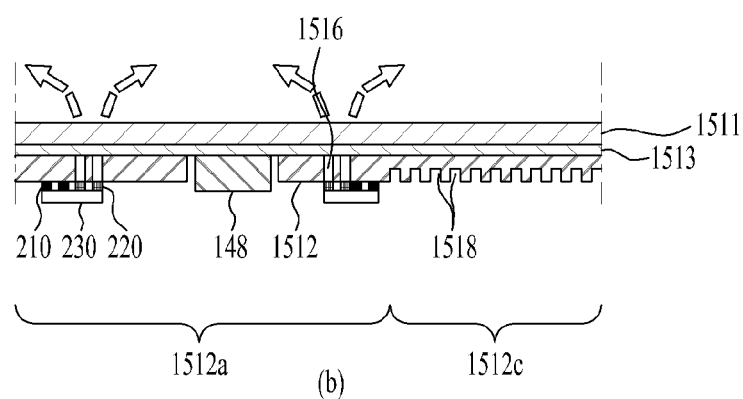

FIGS. 12 and 13 are views illustrating coil antennas 210 and 220 and a fingerprint sensor 148 applied to a mobile terminal 100 according to another example. The display panel 1511 positioned on the front surface is omitted to expose the support frame 1512. The figures show a first coil and a second coil applied to the expandable terminal illustrated in FIGS. 4 to 6. The mobile terminal 100 shown in FIG. 12 is in a second state, which is an expanded state, and a portion thereof where the coil antennas 210 and 220 are positioned may be disposed in a first region that is always positioned at the front. The third region is a portion whose curvature is changeable, and is subjected to bending deformation and a different arrangement according to the state of the mobile terminal 100. Accordingly, it is difficult to implement an antenna having constant performance. Therefore, the coil antenna may be formed in the first region which is always positioned at the front.

In the display unit of the present embodiment, the curvature of the third region 151*c*, which moves between the front and rear surfaces, may vary according to expansion and contraction of the mobile terminal. In order to minimize the influence of the support frame 1512 on the bending deformation of the display unit 151 when the curvature of the third region 151*c* of the display unit 151 is changed, a kerf structure 1518 having a plurality of grooves extending in a third direction (a vertical direction of the terminal) perpendicular to the first direction (movement) may be provided on the rear surface of the display unit. The kerf structure 1518 formed on the rear surface may be bent according to the bending deformation of the third region of the display unit 151. Since the kerf structure 1518 is related to the bending deformation, the kerf structure 1518 may be formed only in the third region 1512*c* of the support frame corresponding to the third region of the display unit.

The antennas shown in FIG. 12(*a*) has the same shape as the antennas of FIGS. 7 and 8, and the antennas are shown in FIG. 12(*b*) has the same shape as the antennas described with reference to FIGS. 9 to 11. Although there is a difference in the mounting area of the display unit 151, predetermined openings 1516 and 1517 may be similarly formed in the support frame 1512, and the coil antennas 210 and 220 may be disposed to overlap the openings 1516 and 1517.

Figure 14:
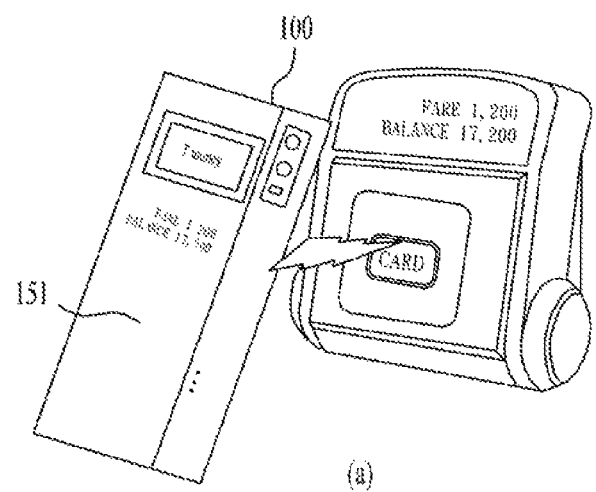
FIG. 14 is a view illustrating an embodiment of use of the mobile terminal of FIG. 12 or 13.
Figure 14:
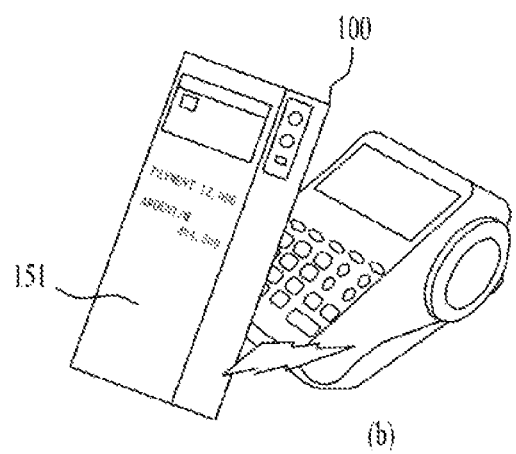

FIG. 14 is a view illustrating an embodiment of use of the mobile terminal 100 of FIG. 12 or 13. The mobile terminal 100 as shown in FIG. 12 may have the display unit 151 positioned on the rear surface thereof in the first state as shown in FIG. 14(*a*). When an NFC antenna or a pay antenna radiating a signal in the forward direction is used, the data obtained through the NFC or payment information may be output to the rear display unit 151.

Figure 15:
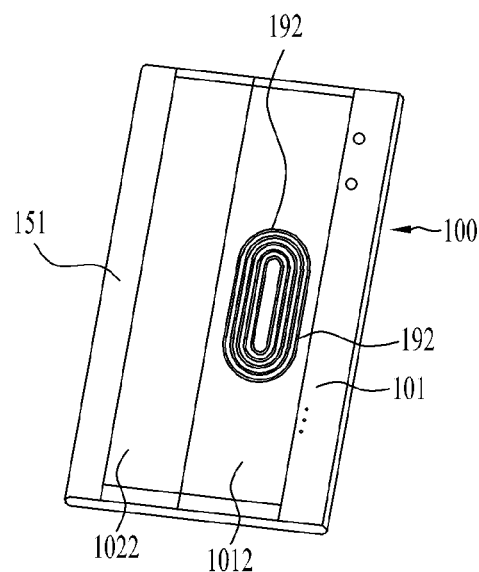
FIG. 15 is a view illustrating an example of a wireless charging coil of the mobile terminal of FIG. 12 or 13.
Figure 15:
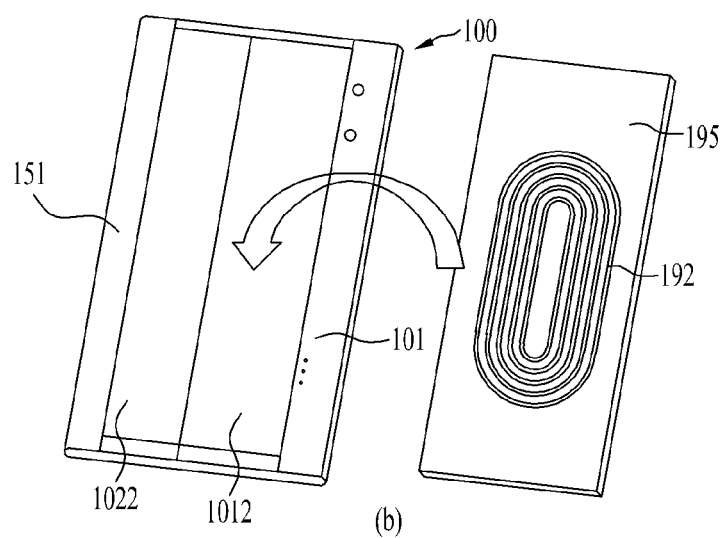

FIG. 15 is a view illustrating an example of a wireless charging coil of the mobile terminal 100 of FIG. 12 or 13. Since the wireless charging antenna should be disposed at a position where the antenna is not affected by the electromagnetic field formed by the charger, it is difficult to dispose the antenna so as to overlap the display unit 151 even if the support frame 1512 is partially omitted, as in the case of the first coil antenna 210 or the second coil antenna 220 described above. The wireless charging function is used when the mobile terminal is mounted on the wireless charger. Accordingly, the function may be disposed on the first rear portion of the first frame exposed when the mobile terminal 100 is switched to the second state as shown in FIG. 15(*a*), such that charging is performed by removing the display unit 151, which covers the charging coil 192, after the mobile terminal is switched to the second state.

Alternatively, wireless charging may be performed using an auxiliary battery 195 as shown in FIG. 15(*b*). The auxiliary battery 195 may include the charging coil 192 and thus may be charged when mounted on the wireless charger. The auxiliary battery 195 which may be inserted into the rear surface of the mobile terminal exposed when the mobile terminal is switched to the second state may be used. The auxiliary battery 195 may include a fastening structure that may be fastened to the rear surface exposed in the second state and a connection structure connected to a battery 191 built in the mobile terminal 100.

The mobile terminal 100 of the present disclosure may increase the utilization of the rear surface thereof by arranging the coil antennas 210 and 220 on the front surface thereof.

In addition, even when it is difficult to arrange the coil antennas 210 and 220 on the rear side of the mobile terminal 100 as in the case where the display unit 151 extends up to the rear surface of the mobile terminal, the coil antennas 210 and 220 may be provided.

Optimum openings 1514, 1516, and 1517 for each of the coil antennas 210 and 220 may be formed in the support frame 1512. Thereby, antenna performance may be secured while maintaining the rigidity of the support frame 1512.

The above embodiments should be construed in all aspects as illustrative and not restrictive. The scope of the disclosure should be determined by the appended claims and their legal equivalents, and all changes coming within the meaning and equivalency range of the appended claims are intended to be embraced therein.

What is claimed is:

1. A mobile terminal comprising:
   a body;
   a display panel coupled to the body and having a front surface facing outward for allowing an image to be output therethrough;
   a support frame configured to support a rear surface of the display panel, the support frame having an open slit extending to an end of the support frame;
   a first coil antenna positioned on a rear surface of the support frame, a portion of the first coil antenna across the open slit; and
   an insulating sheet positioned between the first coil antenna and the support frame.

2. The mobile terminal of claim 1, further comprising:
   a reinforcement member comprising a non-conductive material, the reinforcement member attached to the support frame and located at a region of the support frame in which the open slit is formed, the reinforcement member protruding toward the rear surface of the support frame,
   wherein the first coil antenna comprises:
   a first conductive pattern having an annular shape and comprising disconnected portions in a region corresponding to the region of the support frame; and
   a second conductive pattern formed in a shape corresponding to a curve of the reinforcement member to connect the disconnected portions of the first conductive pattern.

3. The mobile terminal of claim 2, wherein the first conductive pattern is formed on the insulating sheet, and
   wherein the second conductive pattern is formed by injection molding and is fixed to the first conductive pattern by surface mount technology (SMT).

4. The mobile terminal of claim 2, wherein a length of the second conductive pattern is greater than a distance between the disconnected portions of the first conductive pattern.

5. The mobile terminal of claim 2, wherein the reinforcement member has an inclined surface configured such that the reinforcement member becomes thinner as the inclined surface extends away from the open slit, the inclined surface forming a continuous surface with the rear surface of the support frame at an end of the region of the support frame.

6. The mobile terminal of claim 1, further comprising:
   a second coil antenna positioned inside the first coil antenna on the rear surface of the support frame,
   wherein the support frame is provided with a plurality of holes formed in a region corresponding to the second coil antenna, and
   wherein the plurality of holes partially expose the second coil antenna toward a front of the support frame.

7. The mobile terminal of claim 6, wherein the second coil antenna is configured to generate a magnetic field to perform a payment function by magnetic secure transmission (MST).

8. The mobile terminal of claim 1, wherein the first coil antenna is configured to perform short-range wireless communication using a frequency signal of 15 MHz or less.

9. The mobile terminal of claim 1, wherein the body is expandable in a first direction,
   wherein the display panel comprises a flexible display panel comprising a front portion positioned on a front surface of the body and a rear portion positioned on a rear surface of the body, and
   wherein, when the body is expanded, an area of the front portion of the display panel is increased, and an area of the rear portion is reduced.

10. The mobile terminal of claim 1, further comprising:
    an adhesive tape coupled to the rear surface of the display panel and configured to fix the first coil antenna and the support frame to the rear surface of the display panel; and
    a ferrite sheet positioned on a surface of the first coil antenna.

11. The mobile terminal of claim 1, wherein the display panel and the support frame each comprises a variable portion that is bendably deformable and a fixed portion that is not bendably deformable, and
    wherein the first coil antenna and the open slit are positioned at the fixed portion of the support frame.

12. The mobile terminal of claim 1, further comprising:
    a fingerprint sensor positioned on the rear surface of the display panel,
    wherein the support frame has an opening formed in a region corresponding to the fingerprint sensor.

13. The mobile terminal of claim 12, further comprising:
    a second coil antenna disposed around the fingerprint sensor and inside the opening of the support frame.

14. A mobile terminal comprising:
    a body;
    a display panel coupled to the body and having a first surface facing outward for allowing an image to be output therethrough;
    a support frame configured to support a second surface of the display panel that is opposite the first surface, the support frame having a plurality of holes formed at a first area thereof;
    a coil antenna positioned on a rear surface of the first area of the support frame; and
    an insulating sheet positioned between the coil antenna and the support frame,
    wherein the plurality of holes partially expose the coil antenna toward a front of the support frame.

15. The mobile terminal of claim 14, wherein the coil antenna is configured to generate a magnetic field to perform a payment function by magnetic secure transmission (MST).

16. A mobile terminal comprising:
    a body;
    a display panel coupled to the body and having a front surface facing outward for allowing an image to be output therethrough;
    a support frame configured to support a rear surface of the display panel, the support frame having an open slit;

a coil antenna positioned on a rear surface of the support frame, a portion of the coil antenna across the open slit; and an insulating sheet positioned between the first coil antenna and the support frame, wherein the coil antenna is configured to perform short-range wireless communication using a frequency signal of 15 MHz or less.

* * * * *